(12) United States Patent
Enders et al.

(10) Patent No.: US 6,186,542 B1
(45) Date of Patent: *Feb. 13, 2001

(54) COMPACT KNEE BOLSTER AIRBAG ASSEMBLY

(75) Inventors: Mark L. Enders, Pleasant View; Daniel S. Garceau, Salt Lake City, both of UT (US)

(73) Assignee: Autoliv ASP, Inc., Ogden, UT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/953,838

(22) Filed: Oct. 14, 1997

(51) Int. Cl.$^7$ .................................................. B60R 21/16
(52) U.S. Cl. ........................................ 280/743.1; 280/753
(58) Field of Search ........................... 280/730.1, 743.1, 280/752, 753, 728.2, 728.3, 731, 732; 180/729

(56) References Cited

U.S. PATENT DOCUMENTS

| | | | |
|---|---|---|---|
| 3,618,977 | 11/1971 | Klove et al. | 280/150 AB |
| 3,618,978 | 11/1971 | Klove et al. | 280/150 AB |
| 3,622,176 | 11/1971 | Byer | 280/150 AB |
| 3,768,830 | 10/1973 | Hass | 280/150 AB |
| 3,817,553 | 6/1974 | Wilfert | 280/150 B |
| 4,948,168 | 8/1990 | Adomeit et al. | 280/732 |
| 5,062,664 * | 11/1991 | Bishop et al. | 280/743 |
| 5,064,217 * | 11/1991 | Shiraki | 280/743 |
| 5,199,739 * | 4/1993 | Fujiwara et al. | 280/732 |
| 5,324,070 * | 6/1994 | Kitagawa et al. | 280/730 R |
| 5,370,417 | 12/1994 | Kelman et al. | 280/751 |
| 5,458,366 | 10/1995 | Hock et al. | 280/729 |
| 5,482,315 | 1/1996 | Chandler, Jr. et al. | 280/741 |
| 5,533,748 | 7/1996 | Wirt et al. | 280/728.3 |
| 5,536,043 | 7/1996 | Lang et al. | 280/753 |
| 5,630,621 * | 5/1997 | Schnieder | 280/753 |
| 5,799,970 * | 9/1998 | Enders | 280/730.2 |
| 5,836,611 * | 11/1998 | Palm | 280/743.1 |
| 5,839,756 * | 11/1998 | Schenck et al. | 280/743.1 |
| 5,845,935 * | 12/1998 | Enders et al. | 280/743.2 |
| 5,857,696 * | 1/1999 | Inoue et al. | 280/728.2 |
| 5,863,064 * | 1/1999 | Rheinlander et al. | 280/732 |

FOREIGN PATENT DOCUMENTS

| | | | |
|---|---|---|---|
| 1455661 * | 11/1976 | (GB) | 280/743 |
| 405208646 * | 8/1993 | (JP) | 280/730 R |

* cited by examiner

*Primary Examiner*—Brian L. Johnson
*Assistant Examiner*—Daniel Yeagley
(74) *Attorney, Agent, or Firm*—Sally J. Brown

(57) ABSTRACT

A knee bolster airbag assembly which provides protection for the airbag cushion during shipment, storage and installation as well as during its installed functional lifetime. The assembly includes an inflator with an initiator, a knee bolster airbag cushion, an inflator housing and a cover. The cover is made of a material which (a) provides protection to the components which it encloses and can (b) be decorative and be compatible with the materials and design of the interior of the passenger compartment of the vehicle in which it is to be installed.

7 Claims, 3 Drawing Sheets

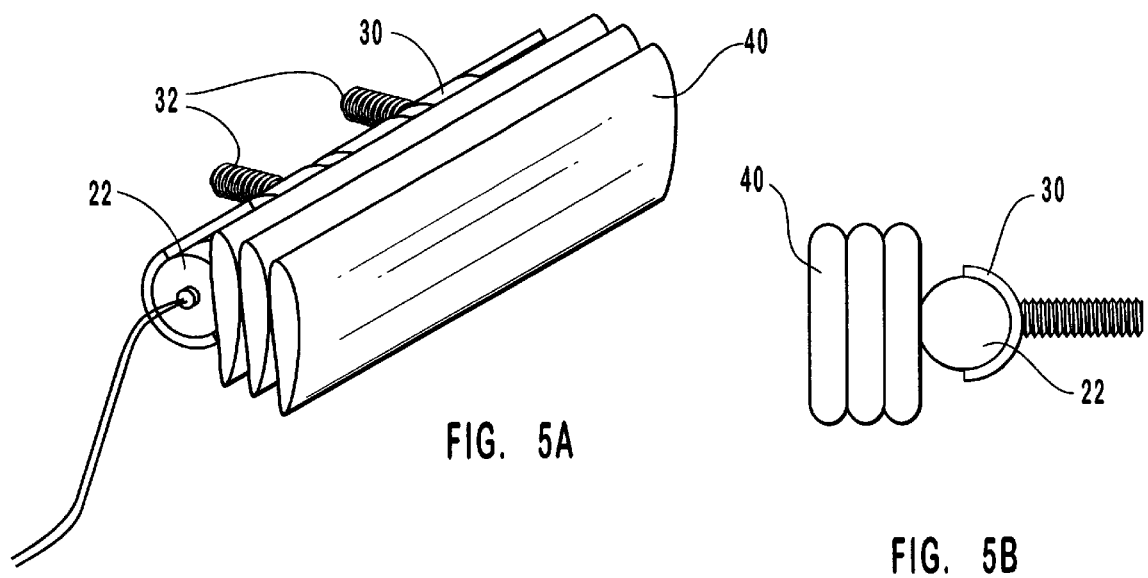
FIG. 5A
FIG. 5B
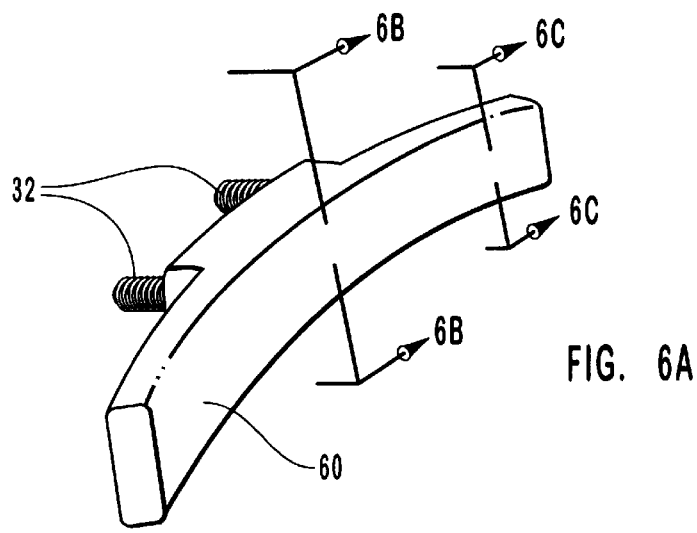
FIG. 6A
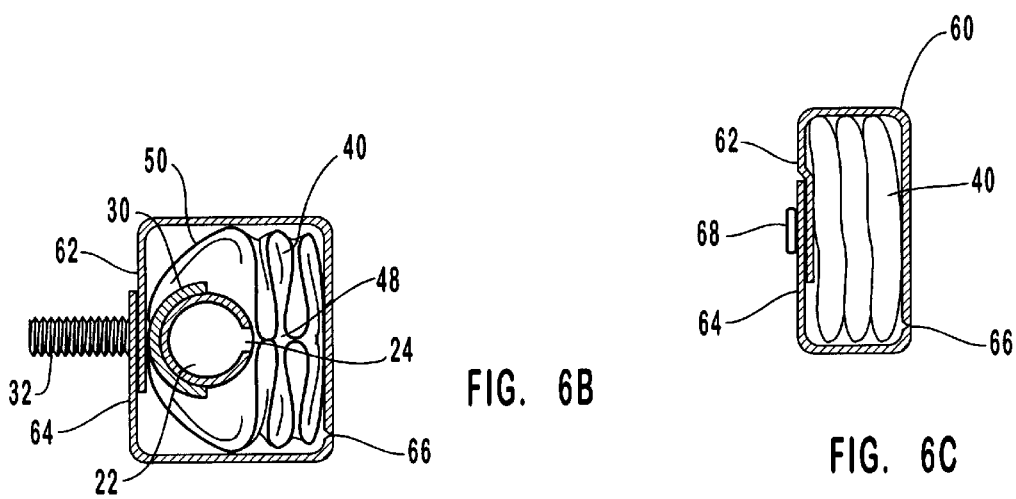
FIG. 6B
FIG. 6C

COMPACT KNEE BOLSTER AIRBAG ASSEMBLY

BACKGROUND OF THE INVENTION

1. Field of the invention

The present invention relates to an inflatable passive restraint system for use in a vehicle. Such systems, generally referred to as airbag systems, are widely used in modern automobiles and trucks. The present invention is directed to an inflatable cushion assembly which is designed to deploy in front of and engage the knee area of a vehicle's occupant in the event of a collision.

2. Description of related art

Airbag systems are recognized as being effective in protecting vehicle occupants in the event of a collision. These systems have been primarily designed to deploy in front of an occupant's torso, and particularly between the upper torso and the vehicle's windshield and instrument panel. They are effective in restraining the occupant's upper body, preventing the occupant from striking the instrument panel or the windshield in a sudden deceleration such as occurs in a collision.

During a front end collision there is a tendency for an occupant, particularly one who is not properly restrained by a seat belt, to slide forward along the seat and "submarine" under the primary airbag. To prevent such an occurrence some vehicles have provided a fixed crushable panel, referred to as a knee bolster, extending downwardly and toward the occupant's knee or lower leg from the instrument panel. During a collision the occupant's legs slide forward and contact the bolster stopping the occupant from sliding further forward under the primary airbag. This panel, however, is fairly large and when optimally located relatively close to the occupant's legs, greatly diminishes the amount of leg room available in front of the occupant.

Other systems, as illustrated in U.S. Pat. Nos. 3,618,977, 3,618,978 and 3,768,830, have used primary airbags which deploy from a relatively low portion of the instrument panel and contact the occupant's leg or knee area as they expand into the area between the occupant's upper torso and the instrument panel and windshield. Another proposal, illustrated in U.S. Pat. No. 4,948,168, uses forces applied by the deploying primary airbag to move or rotate a bolster panel into position in front of the occupant's legs or knees. These systems require very large primary airbags, which are difficult to deploy in the required short activation time, and, in any event, require large inflators. This is a detriment to vehicle manufacturers who generally seek to minimize the space and weight requirements of the components used in their vehicles.

Further systems have been disclosed, in U.S. Pat. Nos. 3,817,553 and 5,458,366, for example, which provide a separate airbag for the knee bolster. The airbag can either directly contact the leg or knee or, as illustrated in several embodiments of the 3,817,553 patent, can provide the motive force for deploying padded deformation members to a position against the occupant's knee. These systems, as illustrated, require substantial space at the surface of the instrument panel and directly behind such surface. Such not only precludes the use of such space for other components, it essentially requires that the knee bolster assembly be specifically and individually designed for each instrument panel design in which it is used. Moreover, the systems incorporate many parts into their assemblies, which not only reduces their overall reliability, it makes them relatively expensive to produce.

SUMMARY OF THE INVENTION

The present invention provides a knee bolster assembly which is compact, economical to fabricate, adaptable for mounting on a variety of instrument panel designs, easily nested in shipping or storage containers for transportation to a vehicle assembly area and readily mountable to a vehicle's instrument panel. The knee bolster assembly neither relies on sharing an oversized inflator with another airbag, nor on an oversized airbag cushion providing the energy necessary for causing the bolster to deploy.

The knee bolster assembly includes a folded airbag cushion which, when mounted in a vehicle, is capable of expanding into the area normally occupied by an occupant's lower legs (below the knee). The assembly also includes an inflator which, when activated by an initiator, is capable of providing the gas required to activate the cushion. The initiator functions to activate the inflator upon the receipt of a signal, usually electrical, from an external crash sensor or switch. A housing is provided which is capable of mounting the inflator and the airbag cushion in an operative position relative to each other as well as relative to the passenger compartment of the vehicle. An openable cover extends around the other components providing protection against dust, mishandling and/or other hazards which might collide with, rub against or pierce the other components of the assembly, particularly, the fabric or sheet material used to form the cushion. The cover includes structure, such as a tear seam, which is designed to open when the expanding activated cushion produces a threshold level of stress at the structure. Since the knee bolster assembly is designed to be mounted at the exterior surface of the instrument panel, the cover is typically made of a decorative material which blends with or complements the materials forming the external surfaces of the instrument panel.

BRIEF DESCRIPTION OF THE DRAWINGS

FIG. 3A is an isometric view of the cushion, while FIG. 3B is a side view of a section of the front face of the cushion.

FIG. 3A is a perspective view of the module, while FIG. 4B is a side view.

FIGS. 5A and 5B illustrate a second form of a knee bolster module forming a portion of the present invention. FIG. 5A is a perspective view of the module, while FIG. 5B is a side view.

FIGS. 6A, 6B and 6C illustrate a knee bolster assembly according to the present invention. FIG. 6A is a perspective view of the assembly, while FIGS. 6B and 6C are sectional views corresponding to the dotted section lines indicated on FIG. 5A.

DETAILED DESCRIPTION OF THE INVENTION

Figure 1:
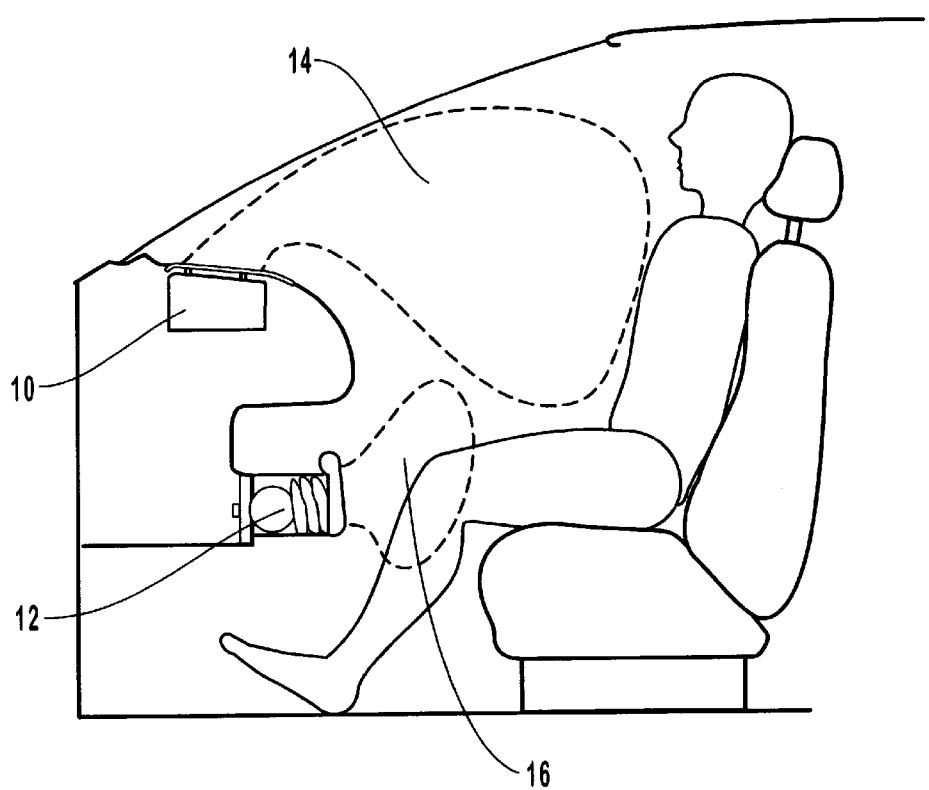
FIG. 1 schematically illustrates how the present invention functions with a primary airbag system to restrain an occupant on the front seat of a vehicle from being thrust forward into the instrument panel or windshield during a collision.

The inventive knee bolster assembly is designed to operate in combination with a primary airbag assembly which, in turn, is designed to deploy in front of and restrain a vehicle occupant's upper body. FIG. 1 schematically illustrates an occupant seated on the front passenger seat of an automobile. The automobile includes a primary airbag assembly 10 mounted in the upper portion of the instrument panel, in the illustrated embodiment it is mounted above and/or behind the glove box. The knee bolster assembly 12 is mounted to the lower portion of the instrument panel opposite the position normally occupied by the occupant's knee and lower leg. Upon receipt of an activation signal transmitted from a crash sensor mounted elsewhere on the vehicle, both cushions inflate and expand into the positions 14 and 16 illustrated by the dotted lines. On activation, the cushion 14 of the primary airbag assembly expands and deploys to a position in front of the occupant's upper body. The primary airbag cushion restrains the upper body from being propelled forward into the windshield and upper portions of the instrument panel. There is a tendency for the lower portion of the occupant's body to be propelled forward whereby it slides under the primary airbag cushion. This tendency is especially pronounced when the occupant is not restrained by a seat belt, or the seat belt is not properly tensioned over the occupant's lap. The cushion 16 of the knee bolster deploys and expands into a position where it holds the knee and lower portion of the leg against the front of the seat, thereby holding the lower portion of the occupant's body in a position which resists the tendency to slide under the primary airbag.

Figure 2:
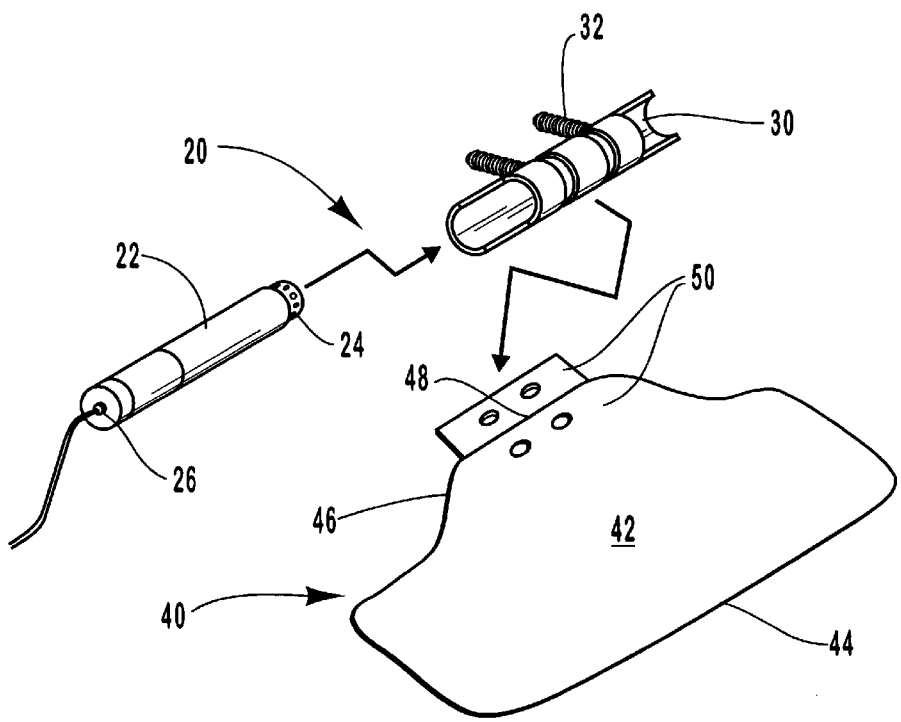
FIG. 2 schematically illustrates in an exploded view, a knee bolster airbag module which forms a portion of the present invention.

A knee bolster module 20 forming part of the present invention is illustrated in exploded form in FIG. 2. The inflator 22 includes exit ports 24 for discharge of the inflation gas and an electrically triggered initiator 26. The inflator 22 is inserted into an elongated generally tubular housing 30. The housing includes mounting means, such as studs 32, for mounting the module to a rigid portion of the vehicle. An inflatable bolster cushion 40 comprising an essentially closed bag or envelope 42 is also mounted to the housing 30. The bag or envelope 42 is formed of two or more layers of a fabric or sheet material joined to define a generally enclosed interior. The cushion includes a wide face portion 44 which is designed to contact and restrain the lower leg portion of a vehicle occupant. Opposite the face portion, the cushion includes a neck portion 46 wherein the width of the cushion is reduced as it extends to an opening 48 to the interior of the bag. The fabric material extends past the opening to form tabs 50 which are capable of extending around the housing 30. The opening 48 into the interior is located adjacent the exit ports 24 of the inflator 22 and the tabs 50 extend around the housing and are either are attached to the housing 30, such as by attachment to the bolts 32; or to each other, such as by sewing or adhesive bonding. The cushion typically is designed to provide forward expansion from the module housing of 300 to 500 mm. The interior volume of the expanded cushion is typically in the range of 15 to 25 liters.

Figure 3A:
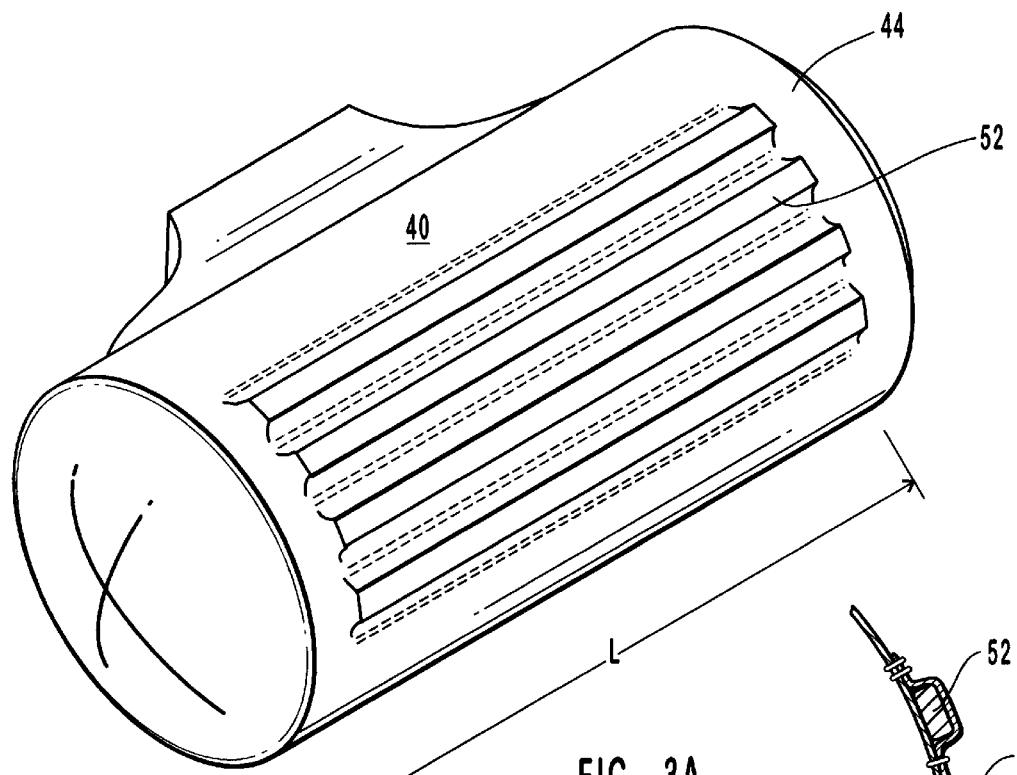
FIGS. 3A and 3B illustrate a preferred knee bolster cushion according to the present invention.
Figure 3B:
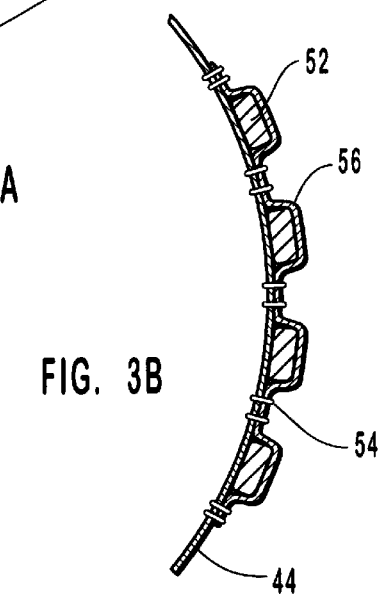
Figure 4A:
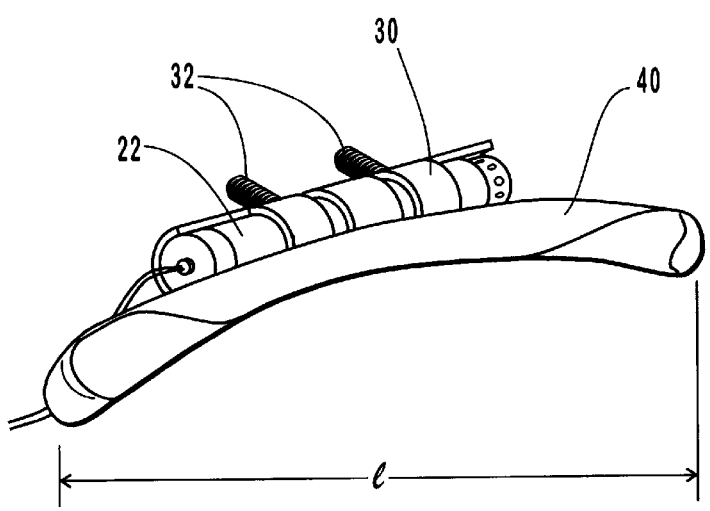
FIGS. 4A and 4B illustrate one form of a knee bolster airbag module which forms a portion of the present invention.
Figure 4B:
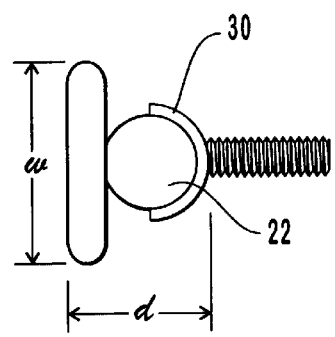

A particularly advantageous knee bolster cushion is illustrated in FIGS. 3A and 3B. When the knee bolster is activated, it expands in a manner which advances the face portion 44 of the cushion 40 toward the lower legs or knees of the vehicle's occupant. After the initial contact with the occupant's legs, a pliable cushion will tend to continue its expansion into the areas along the sides of the legs. While such operation exerts a force on the occupant's legs tending to direct and hold them against the front of the seat, we have found that the effective force applied to the occupant's legs can be substantially enhanced by the knee bolster cushion illustrated in these figures. The exterior surface of the face portion 44 of this cushion 40 includes stiffening slats 52 extending substantially the length, L, of the cushion. The slats are sufficiently affixed to the face portion of the cushion to spread the "point" impact loading of the cushion, created by the relatively narrow zone of contact with the occupant's lower legs, along the length of the cushion. The slats may be affixed to the cushion by a plurality of point attachments along the length of the slat 52. As illustrated in FIG. 3B, it is preferred that the slat be attached by sewing it, with stitches 54, between the exterior front face 44 of the cushion and an exterior fabric 56. The slats are made of light weight, rigid materials which are capable of withstanding impacts at temperatures from −30° C. to +90° C. Suitable materials include aluminum; plastics, such as polycarbonate, polypropylene, polyimide and polyamide; and composite materials. Preferably, the slats are 15 to 24 inches long, which is sufficiently long to provide that, upon activation, the portions of the cushion to which such a slat is affixed will contact both of the occupant's legs.

The cushion is folded into a compact but readily inflatable form either before or after being mounted to the housing. Depending upon factors such as the space available for mounting the knee bolster assembly to the instrument panel in the intended vehicle model, the required size of the cushion, the size of any reinforcing slats on the cushion; the dimensions, length l, width w, and depth d, of the airbag module containing the folded cushion can vary widely. Two examples are illustrated in FIGS. 4A, 4B and 5A, 5B. The item numbers in these Figures correspond to the same item numbers as used in FIG. 2. The module illustrated in FIGS. 4A and 4B has relatively long and slender dimensions. Its length, l, approximates the length, L, of the knee bolster cushion. Its front to rear dimension, or depth, d, is relatively small, allowing it to be mounted either to the surface of the instrument panel or in a small depression extending along the instrument panel, without significantly affecting the interior space of the passenger compartment, i.e. without significantly affecting the "leg room". This is a particularly effective configuration for packaging modules containing knee bolster cushions which include reinforcing slats as are used in the cushion illustrated in FIG. 3. It allows the cushion to be folded without having to fold the individual slats upon themselves and, therefore, permits a wider selection of materials to be used to form the slats. The module illustrated in FIGS. 5A and 5B uses a folding pattern which brings the outer side portions of the cushion to a more central folded location. It results in a module which is shorter in length, but has a greater depth, than the module illustrated in FIGS. 4A and 4B. The longest dimension of the folded bolster cushion can vary between about 250 to 800 mm, while its depth can vary from about 10 to about 40mm.

One embodiment of the inventive knee bolster assembly is schematically illustrated in FIGS. 6A, 6B and 6c. A distinguishing feature of the inventive knee bolster assembly is the module cover which extends around the folded airbag cushion over the major portion of its length and, preferably, fully encloses the folded cushion. In its most preferred form, the module cover essentially fully encloses the assembled module comprising the folded airbag cushion, the inflator and the housing, leaving uncovered only portions of the mounting means for attaching the assembly to the vehicle. As seen in FIG. 6A the module is essentially fully enclosed within the module cover 60, with only the mounting bolts 32 extending out from the enclosed space defined by the cover. The module cover 60 is formed from a relatively rigid, strong and lightweight material which provides an attractive surface finish, long term structural rigidity, and protects the enclosed components from piercing, cutting and abrading hazards. Such materials include rigid and semi-rigid polymers, composite materials and lightweight metals. Rigid and semi-rigid thermoplastic elastomers, such as polyesters, are presently preferred due to their satisfactory performance, ready availability, low cost and design compatibility with modern instrument panels.

FIG. 6B illustrates a sectional view of the assembly at section line 6B—6B of FIG. 6A. The assembly includes an inflator 22 assembled within a housing 30 with folded cushion 40 extending along a first side of the housing 30. Mounting bolts 32 extend from a second side of the housing opposite the first side. The flaps 50 of the cushion 40 extend around the housing 30 and are attached to the mounting bolts 32 thereby aligning the cushion's opening 48 over the exhaust ports 24 of the inflator 22. The cover 60 extends from its first side 62 to its second side 64 the entire length of the airbag cushion 40. The cover includes apertures adjacent each of the sides 62 and 64 which fit over the mounting bolts 32 to provide a strong, relatively rigid enclosure of the knee bolster module. The cover includes a tear seam 66, or other opening structure, extending the length of the cover, and designed to allow the two sides of the tear seam to separate when subjected to the stress created when activated knee bolster cushion 40 begins to expand, thereby allowing the cushion to fully expand as illustrated in FIG. 1. The tear seam can be formed by perforations extending the length of the cover, by a weakened portion of the material forming the cover extending its length, by a slit or groove extending partially through the thickness of the material or by any other structural feature which allows the cover to tear or separate when subjected to the stress created by the expanding cushion.

FIG. 6C is a further sectional view of the FIG. 6A assembly as viewed at the section lines 6C—6C. The cover 60 extends about the folded cushion 40 from its first side 62 to its second side 64. Cooperating connecting structure 68 is provided adjacent each of the first and second sides. The connecting structure 68 can be rivets, hooks, a layer of adhesive, a matched protuberance and aperture of the type generally referred to as snaps, or any similar structure capable of rigidly connecting together the two sides 62 and 64 of the cover 60. As noted previously, tear seam 66 extends the length of the cover.

It will be apparent to workers in the art that a cover for the knee bolster module shown in FIG. 5A and 5B need not be as long as the cover shown in FIGS. 6A, 6B and 6C, but will require a somewhat greater front to rear depth to accommodate a knee bolster cushion of equivalent dimensions to that used in the embodiment shown in the FIGS. 6A, 6B and 6C. Such a knee bolster assembly could be mounted either on or in the instrument panel or on the steering column.

The knee bolster assembly provides a compact unitary structure which is well suited for assembly at one location and incorporation into a vehicle at a second location. The assembly includes a cover which is capable of protecting the components not only as installed in their ultimate location in a vehicle, but also as the assembly is stored, shipped and assembled into the vehicle. The assembly is also capable of being mounted in a relatively narrow, or shallow, space, such as on the surface, or in an indent on the surface, of an instrument panel, providing improved accessibility to the assembly for maintenance or replacement.

The foregoing description and illustrations are provided to fully enable one of ordinary skill to practice our invention and are not intended to limit the scope of the invention. The following claims should be looked to for definition of our invention and its scope.

We claim:

1. A knee bolster airbag assembly, comprising:

a folded airbag cushion, wherein said airbag cushion includes,
a front face,
an exterior layer disposed on said front face, and
at least one rigid stiffening slat disposed between said front face and said exterior layer extending substantially the length of said cushion;

an inflator capable of discharging sufficient inflation gas to fully inflate said airbag cushion when activated;

an initiator capable of activating said inflator upon receipt of an activation signal;

an initiator housing holding said inflator in a position whereby said inflation gas is directed to the interior of said folded airbag cushion; and an openable cover extending around said folded airbag cushion.

2. A knee bolster airbag assembly according to claim 1, wherein said airbag cushion includes a plurality of stiffening slat.

3. A knee bolster airbag assembly according to claim 1, wherein said at least one stiffening slat is from fifteen to twenty-four inches long.

4. A knee bolster airbag assembly according to claim 1, wherein said airbag cushion includes a face portion which will contact the lower legs of a vehicle's occupant when the assembly is mounted and deployed in a vehicle, and said at least one stiffening slat is affixed to said face portion.

5. A knee bolster airbag module comprising:

an airbag cushion;

an inflator capable of discharging sufficient inflation gas to fully inflate said airbag cushion when activated;

an initiator capable of activating said inflator upon receipt of an activation signal;

an inflator housing holding said inflator in a position whereby said inflation gas is directed to the interior of said airbag cushion; wherein
said airbag cushion includes,
a front face,
an exterior layer disposed on said front face, and
a plurality of rigid stiffening slats disposed between said front face and said exterior layer extending substantially the length of said cushion.

6. A knee bolster airbag module according to claim 5, wherein said plurality of stiffening slats are attached to the portion of said cushion which, upon activation of the module, will make contact with the lower legs of a vehicle's occupant.

7. A knee bolster airbag module according to claim 5, wherein each of said plurality of stiffening slats are attached to the cushion in an essentially parallel relationship to the length of said cushion.

* * * * *